United States Patent Office 2,891,854
Patented June 23, 1959

2,891,854

CHELATED IRON COMPOSITIONS

Harry Kroll, Warwick, R.I., and Joseph Antognini, Cranford, N.J., assignors to Geigy Chemical Corporation, New York, N.Y., a corporation of Delaware No Drawing. Application June 16, 1954
Serial No. 437,300

11 Claims. (Cl. 71—1)

The present invention relates to compositions of matter which contain, as essential active ingredient, ferric chelate of diethylenetriamine pentaacetic acid and to the employment thereof for correcting iron deficiencies in growing plants.

The use of iron chelates of ethylene diamine tetraacetic acid (EDTA) for the treatment of iron deficiencies (iron chlorosis) of certain economic crops is known. The nutritional condition known as iron chlorosis is recognized by the yellow pattern exhibited by the leaves. The area of the leaf between the veins stands out as a yellow green in contrast to the dark green veining. With advanced iron deficiency, this contrast disappears and the leaves become ivory color; the plants become partially defoliated; and as a terminal result, the plant will die. The iron deficiency may be due to several factors. Some of these are (1) an actual deficiency of iron in the soil, (2) high manganese and copper contents of the soil, (3) an alkaline soil (above pH 7.0), and (4) the presence of a high concentration of calcium carbonate.

In central Florida, the use of iron-EDTA chelates has been successful in alleviating mild to extreme conditions of iron chlorosis existing in the orange and grapefruit groves of this area. Despite the effectiveness of the iron-EDTA in overcoming the deleterious effects of iron deficiencies, its widespread use for maintaining economic crops in a normal state of iron balance has been limited. These limitations are the result of its tendency to produce burn when coming in contact with the fruit and leaves of the plant, and its ineffectiveness in overcoming iron chlorosis when used in economic amounts for the treatment of plants grown on alkaline soils.

One of the current practices in the application of the iron-EDTA chelate requires that the compound be intimately mixed with fertilizer and distributed as a soil application by means of mechanical spreaders. This method of distribution produces a dust which settles on the leaves and fruit. It has been found that fertilizer dust containing the iron-EDTA produces burning on both leaves and fruit. The burning of citrus fruit results in a poorer quality fruit, a premature dropping of unripe and ripe fruit, and a down grading of what otherwise might be considered normal fruit. Where spray applications have been used for treating various crops for iron deficiencies, the iron chelate of EDTA can produce severe leaf burn, leaf drop, and fruit burn.

In most cases where plants are grown in alkaline, calcareous soils applications of Fe-EDTA to the soil are economically ineffective. It has also been applied as a spray to plants grown on these soils, and its effectiveness in alleviating the iron deficiency has only been moderate when used in amounts which are effective on plants grown in more acid soils.

A primary object of the present invention is the embodiment of a composition of matter capable of eliminating iron chlorosis, while being free of the deficiencies of the prior art composition as afore-outlined.

According to the present invention, this object is realized with the aid of the iron chelates of diethylenetriamine pentaacetic acid (DTPA), the formula of which is as follows:

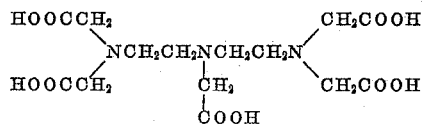

Both the iron-DTPA chelate and the iron-EDTA chelate are equally effective in remedying the chlorosis in iron deficient plants grown on acidic soils. However, in marked contrast to the iron-EDTA chelate, the iron-DTPA chelate is much more effective in alkaline soils, and is much less toxic to the treated plant.

The decrease in phytotoxicity is extremely important since it adds to the number of plants benefiting from iron chelate application, those plants which are quite sensitive to Fe-EDTA and are therefore injured by its use. It has been estimated that forty percent of the citrus in Florida suffer from marginal deficiencies of iron, yet maintenance application of iron-EDTA is not practiced despite the prospect of increased yields and improved quality of the crop. The reason for this is that in either spray or soil application, contact of the iron-EDTA chelate with the fruit produces burn and premature fruit drop with the resultant economic loss to the grower. The fact that the iron-DTPA chelate, according to the present invention, shows less phytotoxicity than the iron-EDTA provides the DTPA chelate with a greater margin of safety on many plants.

For example, a series of one acre blocks of orange trees consisting of Pineapple and Valencia varieties were treated with iron-DTPA and iron-EDTA, severally, mixed with an 8-0-8 (N-P-K) fertilizer and applied at the rate of one-third of a pound of iron chelate per tree. After three weeks, it was found that the iron-EDTA treated grove had a fruit drop which amounted to five boxes of fruit, whereas the iron-DTPA treated grove showed a fruit drop of equivalent to only two boxes.

Similar results have also been obtained with spray application. Tests in California have indicated that at the same level of iron content, the spray application of the iron-DTPA chelate to citrus produces little or no leaf burn whereas the leaves treated with EDTA chelate exhibit marked burning.

Other crops also react more favorably to the iron-DTPA. Thus chlorotic peach trees treated with two pounds of iron-DTPA per tree showed very effective greening, whereas iron-EDTA treated trees exhibited only mild greening and mild to severe injury to the foliage.

California pears were treated by foliage application of a spray containing one pound of iron chelate per one hundred gallons of solution. Good greening and no phytotoxic effects were observed with the iron-DTPA treated trees whereas the iron-EDTA treated trees showed fair greening but also moderate injury.

Extensive comparative studies have been carried out on the effectiveness of iron-DTPA and iron-EDTA in correcting iron deficiencies of plants grown on soils having a pH 7.0 or greater. Measurements on the uptake of chelated radio-active iron from various types of alkaline soils by several different species of plants have shown that the iron-DTPA chelate is more effective than the EDTA derivative. This has been found to be especially true for alkaline soil containing a high lime content.

Soil applications of the iron-DTPA chelate were made to young chlorotic grapefruit trees growing in soil in which the pH ranged from 7.7 to 8.0 and having a calcium carbonate content of one to two percent. Rates of application were 11.5 grams of metallic iron per tree. The resultant greening was good. A similar test carried out with iron-EDTA at the same concentration of chelated iron resulted in no correction of the chlorotic pattern.

A large variety of plants can be treated with iron-DTPA chelate, with favorable results. These include ornamentals, deciduous fruits, grasses, vegetables, etc. All citrus grown on acid or neutral soils and exhibiting a chlorotic pattern respond favorably to iron-DTPA. Favorable response is also obtained from avocados, grapefruit, oranges, and tangerines growing on alkaline soils.

The iron chelates of DTPA which are employed according to the present invention can be prepared from the free diethylenetriamine pentaacetic acid in a variety of ways, and are preferably isolated as the free acid, the monosodium salt or the disodium salt, although other salts such as the potassium salts or ammonium salts may also be employed.

The compositions of matter according to the present invention comprise dosage units of ferric chelate of diethylenetriamine pentaacetic acid or its salts. These dosage units facilitate administration of the chelate to the chlorotic plants being treated. A preferred dosage unit, according to the invention, comprises from about 0.01 to about 50% of ferric chelate of diethylenetriamine pentaacetic acid or salt thereof. The dosage unit forms may be of various embodiments. An advantageous dosage unit comprises a uniform admixture of the said ferric chelate or salt thereof with an inert adjuvant which is conventional in agricultural chemicals, e.g. sand. Use of such a dosage unit not only enables an appropriate dose to be administered to the plant being treated but enables administration by soil application to be effected in uniform manner. Another advantageous unit form comprises an intimate admixture of the chelate according to the invention with a so-called balanced fertilizer or, in appropriate circumstances, with other fertilizer compositions. These can also be uniformly applied, e.g. by means of a mechanical spreader. Still another advantageous unit form comprises a solution of the ferric chelate of the invention in a suitable liquid, e.g. water or an aqueous nutrient solution. This dosage unit form enables controlled administration by foliage spraying, etc. The various dosage unit forms may, if desired, comprise other inert or active materials.

Representative procedures for preparing the iron chelates of the present invention are set forth by way of example in the following illustrative examples. In these examples, the parts and percentages are by weight.

EXAMPLE 1

To a slurry of 39.3 parts of diethylenetriamine pentaacetic acid in 40 parts of water are added 32 parts of aqueous sodium hydroxide solution of 50% strength. To the resultant solution, 40.5 parts of an aqueous ferric chloride solution of 40% strength are then added. Sodium hydrogen ferric diethylenetriamine pentaacetate precipitates; the crystalline precipitate is filtered off, washed with a small volume of water, and air dried. The product corresponds to the formula

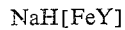

where [FeY]= represents the ferric chelate, and Y stands for

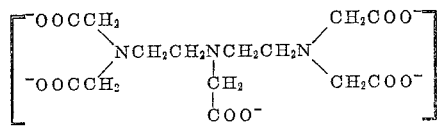

In analogous manner, the corresponding potassium hydrogen and ammonium hydrogen salts may also be prepared.

EXAMPLE 2

A solution consisting of 39.3 parts of diethylenetriamine pentaacetic acid, 40 parts of water and 24 parts of aqueous sodium hydroxide solution of 50% strength is added to 38.5 parts of an aqueous ferric chloride solution of 42% strength. The precipitated dihydrogen ferric diethylenetriamine pentaacetate, i.e. the free acid of the formula $H_2[FeY]$, is filtered from the reaction liquid, washed with water and dried. In the said formula, [FeY]= and Y have the afore-indicated significances.

EXAMPLE 3

Six parts of diethylenetriamine pentaacetic acid are added to 14.8 parts of water containing 0.72 part of iron filings and 0.15 part of ammonium nitrate. The mixture is agitated and heated to 80° C. Two parts of aqueous hydroxide solution of 50% strength are then added to the reaction mixture over a period of two to three hours, keeping the pH at 4 to 5. After all the iron has dissolved, the hot solution is evaporated to dryness. The resulting product is the disodium salt of the ferric chelate of diethylenetriamine pentaacetic acid, and corresponds to the formula $Na_2[FeY]$.

In analogous manner, the corresponding dipotassium and diammonium salts may also be prepared.

The iron-DTPA, as the free acid or in the form of any of the hereinbefore-mentioned salts, may be applied in a wide variety of ways. Presently-preferred modes of application are summarized in the following:

A. Soil applications (1) Apply as a dry powder to soil surface.
(2) Apply in solution to soil surface.
   (a) For citrus trees—⅓ pound iron-DTPA in 5 gallons of water per tree.
   (b) For crop land—20 pounds iron-DTPA per 200 gallons of water per acre.
(3) Apply in the dry form mixed with an inert carrier.
   (a) One-third pound iron-DTPA plus 5 pounds sand per citrus tree.
(4) Apply in dry form mixed with fertilizer.
   (a) For citrus trees—⅓ pound iron-DTPA plus 4⅔ pounds of fertilizer such as a 13–0–13 (N–P–K) analysis fertilizer per tree.
   (b) For azaleas—1 pound iron-DTPA plus 99 pounds of fertilizer such as a 27–9–9 (N–P–K) analysis fertilizer and apply to 300 square feet.

B. Foliage applications (1) Apply as a thorough cover spray containing 1 to 4 pounds iron-DTPA per 100 gallons of water.
(2) Apply as a thorough cover spray containing 1 to 4 pounds of iron-DTPA plus other chelated minor elements at recommended rates per 100 gallons of water.
(3) Apply as a thorough cover spray containing 1 to 4 pounds of iron-DTPA plus insecticides and/or fungicides at recommended rates.
(4) Combination of 2 and 3 above.

C. Injection applications (1) Injection into stems or trunks of plants in solution.
(2) Injection into stems or trunks of plants in the dry form.

D. Seed treatment

Treatment of seeds of annual and perennial plants with a solution, slurry or dry powder.

Representative examples illustrating the employment of the compositions of the invention in correcting iron deficiencies in growing plants follow:

EXAMPLE 4

Iron deficient Eureka lemon trees growing on a sandy clay loam soil (pH about 8.2) are treated with ½ pound of iron-DTPA per tree, applied alone to the soil surface beneath the trees. The iron-DTPA is eventually dissolved in the soil moisture and the resultant aqueous solution contains the iron in a form which is available to the tree roots. It is advantageous, following the application of the iron-DTPA, to thoroughly water the soil in to a depth of at least 6 inches, thereby bringing the active agent closer to the tree roots. Five weeks or less after the application, correction of the iron deficiency is apparent, as evidenced inter alia by the elimination of the yellow areas on the foliage and by the appearance of new dark green growth.

In like manner, similar results may be achieved when, in lieu of the ½ pound of iron-DTPA, use is made of ½ pound per tree of the sodium salt or the disodium salt or the potassium salt or the dipotassium salt or the ammonium salt or the diammonium salt.

EXAMPLE 5

Iron deficient lemon trees growing on calcareous soil (pH about 8.0) are treated with, per tree, ½ pound of iron-DTPA mixed uniformly with ½ pound of sand (50% iron-DTPA by weight). The mix is applied to the soil surface, the inert sand facilitating uniform application. Correction of the iron deficiency is noted in the manner set forth in Example 1.

EXAMPLE 6

A solution of ½ pound of iron-DTPA in 10 gallons of water (0.59% iron-DTPA by weight) is applied to the soil (alkaline; pH=8.5) beneath an iron deficient apple tree. Correction of the deficiency is obtained in a period of about four weeks.

EXAMPLE 7

Soil application with a uniform mixture of ⅓ pound of iron-DTPA and 5 pounds of sand (6.2% Fe-DTPA by weight) per tree corrects iron deficiency in orange trees within a period of about 5 weeks. pH of the soil: about 5.5.

EXAMPLE 8

Iron deficient orange trees are treated with ⅓ pound of iron-DTPA plus 4⅔ pounds of a 13-0-13 (N-P-K) fertilizer (6.6% Fe-DTPA by weight) per tree. The material is applied to the soil (pH of about 5.0) beneath the trees with the aid of a fertilizer distributor. Correction of the iron deficiency is obtained in five weeks.

EXAMPLE 9

Iron deficient azaleas are treated with a uniform mixture of iron-DTPA and 99 pounds of a 27-9-9 (N-P-K) fertilizer (1.0% Fe-DTPA by weight) applied as a soil application to 300 square feet. Soil pH=about 5.0. Correction of the iron deficiency is noted within a few weeks.

EXAMPLE 10

Iron deficient pasture (neutral soil, pH of about 7.0) is treated with 36 pounds of iron-DTPA in admixture with 800 pounds of a 5-10-10 (N-P-K) fertilizer (4.3% Fe-DTPA by weight), applied as a soil application to one acre. Correction of the deficiency is noted within four weeks.

It will be understood that, in each of Examples 6 to 10 inclusive, the iron-DTPA may, with equal success, be replaced by the corresponding quantity of one of the iron-DTPA salts hereinbefore mentioned. It will further be understood that in each case of soil application, it is expedient but not indispensable to water in the application.

EXAMPLE 11

Iron deficient peach trees growing on alkaline soil (pH=8.5) are given a thorough cover spray with a solution of 2 pounds of iron-DTPA in 100 gallons of water (0.24% Fe-DTPA by weight). This foliage application results in correction of the iron deficiency within about four weeks.

The free acid may, as in the preceding examples, be replaced by one of the aforementioned salts.

EXAMPLE 12

Iron-DTPA is used in a conventional nutrient solution at a concentration of 100 parts per million (0.01% Fe-DTPA by weight). Tomato plants grown in this solution show no iron deficiency symptoms whereas those grown in an identical nutrient solution containing no iron-DTPA showed severe iron deficiency.

It will be understood that other ornamentals than azaleas may be treated, for instance, after the manner of Example 9. These comprise inter alia camellias, cherry laurel, chrysanthemum, ornamental citrus, carnations, gardenias, gladioli, hibiscus, holly, hydrangeas, ixora, ligustrum, *Pieris japonica*, rhododendrons, roses, snapdragons, etc., also ornamental trees and large shrubs such inter alia as magnolia, pin oak, Russian olive, sandcherry, spruce, etc. The active material according to this invention may be used in the treatment of iron-deficient lawns, essentially after the manner of Example 10. Vegetables which may be treated with iron-DTPA, for example in the form of sidedressing applications in admixture with fertilizer applied 4 weeks after planting comprise watermelons, cabbage, corn, peppers (18-36 pounds per acre); snapbeans, carrots, cauliflower, eggplant (18 pounds per acre); summer squash (36 pounds per acre); etc.

Having thus disclosed the invention, what is claimed is:

1. A composition of matter for correcting iron deficiencies in growing plants, especially in alkaline soil, containing from 0.01 to 50% by weight of a compound of the formula $$M_2[FeY]$$

wherein [FeY]= represents the ferric chelate, Y stands for $$\begin{bmatrix} {}^-OOCCH_2 & & CH_2COO^- \\ & \diagdown NCH_2CH_2NCH_2CH_2N \diagup & \\ {}^-OOCCH_2 & CH_2 & CH_2COO^- \\ & COO^- & \end{bmatrix}$$

and $M_2$ is a combination of two elements selected from the group consisting of H,H
Na,Na
K,K
$NH_4,NH_4$
Na,H
K,H and
$NH_4,H$ and an agricultural chemical adjuvant.

2. A composition of matter for correcting iron deficiencies in growing plants, especially in alkaline soil, containing from 0.01 to 50% by weight of sodium hydrogen ferric diethylenetriamine pentaacetate, and an agricultural adjuvant.

3. A composition of matter for correcting iron deficiencies in growing plants, especially in alkaline soil, containing from 0.01 to 50% by weight of sodium hydrogen ferric diethylenetriamine pentaacetate in solution in water.

4. A composition of matter for correcting iron deficiencies in growing plants, especially in alkaline soil, containing from 0.01 to 50% by weight of sodium hydrogen ferric diethylenetriamine pentaacetate in admixture with sand.

5. A composition of matter for correcting iron deficiencies in growing plants, especially in alkaline soil, containing from 0.01 to 50% by weight of sodium hydrogen ferric diethylenetriamine pentaacetate in admixture with a fertilizer.

6. A composition of matter for correcting iron deficiencies in growing plants, especially in alkaline soil, said composition containing from 0.01 to 50% by weight of dihydrogen ferric diethylenetriamine pentaacetate, and an agricultural adjuvant.

7. A composition of matter for correcting iron deficiencies in growing plants, especially in alkaline soil, said composition containing from 0.01 to 50% by weight of disodium ferric diethylenetriamine pentaacetate, and an agricultural adjuvant.

8. The method of correcting iron deficiency in a growing plant in alkaline soil, which comprises administering a compound of the formula $$M_2[FeY]$$

wherein [FeY]= represents the ferric chelate, Y stands for

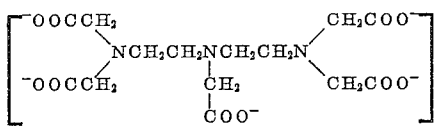

and $M_2$ is a combination of two elements selected from the group consisting of H,H
Na,Na
K,K
$NH_4,NH_4$
Na,H
K,H and
$NH_4,H$ to the plant in a quantity effective to correct the iron deficiency.

9. The method of correcting iron deficiency in a growing plant in alkaline soil which comprises administering dihydrogen ferric diethylenetriamine pentaacetate to the plant in a quantity effective to correct the iron deficiency.

10. The method of correcting iron deficiency in a growing plant in alkaline soil which comprises administering sodium hydrogen ferric diethylenetriamine pentaacetate to the plant in a quantity effective to correct the iron deficiency.

11. The method of correcting iron deficiency in a growing plant in alkaline soil which comprises administering disodium ferric diethylenetriamine pentaacetate to the plant in a quantity effective to correct the iron deficiency.

References Cited in the file of this patent

UNITED STATES PATENTS

| | | |
|---|---|---|
| Re. 23,115 | Lontz | May 24, 1949 |
| Re. 23,766 | Bersworth | Jan. 12, 1954 |
| 2,387,735 | Bersworth | Oct. 30, 1945 |

OTHER REFERENCES

Jacobson, in "Plant Physiology," April 1951, pages 411 to 413 incl.

Stewart et al., in "Science," vol. 116, November 21, 1952, pages 564 to 566.

"California Agriculture," October 1953, pages 13 and 14.